United States Patent [19]

Clingenpeel

[11] 4,304,827
[45] Dec. 8, 1981

[54] SIDE TERMINAL BATTERY

[75] Inventor: William R. Clingenpeel, Holland, Pa.

[73] Assignee: Exide Corporation, Philadelphia, Pa.

[21] Appl. No.: 153,548

[22] Filed: May 27, 1980

[51] Int. Cl.³ .............................................. H01M 2/02
[52] U.S. Cl. ................................... 429/179; 429/181; 429/185
[58] Field of Search ......................... 429/179, 181–183, 429/185

[56] References Cited

U.S. PATENT DOCUMENTS

| | | | |
|---|---|---|---|
| 3,928,079 | 12/1975 | Jennings et al. ..................... | 429/179 |
| 4,100,674 | 7/1978 | Tiegel ............................... | 429/179 X |
| 4,143,215 | 3/1979 | Mocas .................................. | 429/179 |
| 4,154,907 | 5/1979 | Crow ................................... | 429/179 |
| 4,239,841 | 12/1980 | Rorer .................................. | 429/179 |

Primary Examiner—Charles F. LeFevour
Attorney, Agent, or Firm—Raymond J. Kenny; Edward A. Steen

[57] ABSTRACT

A side terminal battery (10) and method of making same is shown and described. In particular, the terminal (34) includes an electrically conductive plug (24) disposed within an externally extending boss (16). The plug (24) does not extend into the battery (10). Rather, a riser (38) is welded (40) to the plug (24) through an aperture (14) disposed at the base of the boss (16). The terminal (34) is mechanically crimped (42 and 44) to further ensure the leak-resistant soundness of the joint between the plug (14) and riser (38).

9 Claims, 8 Drawing Figures

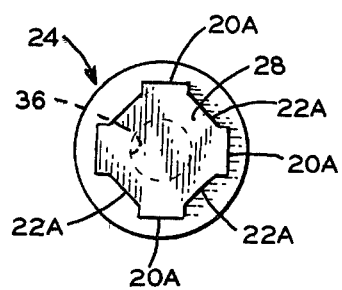
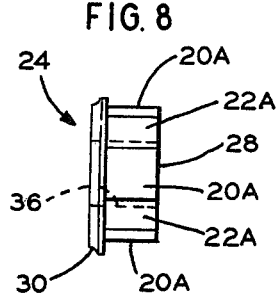

ial patent number 4,304,827

SIDE TERMINAL BATTERY

TECHNICAL FIELD

This invention relates to storage batteries in general and more particularly to batteries having sidewall terminals.

BACKGROUND ART

During the last decade or so, the familiar automobile storage battery has undergone several major improvements. In particular, the placement of the battery terminals has been shifted in some cases from the top of the battery container to the sidewalls thereof.

A great deal of research effort has been expended in order to eliminate or at least substantially reduce battery terminal corrosion. Conventional top terminals are constantly exposed to the debilitating effects of the environment. Rain, road splash, road salt, and airborne pollutants in combination with the electrolyte of the battery all eventually take their corrosive toll of the battery terminals. As the familiar white powdery corrosion products collect (primarily lead sulfate and lead carbonate), the electrical contact between the battery terminals and the cable connectors inexorably deteriorates thereby reducing the effectiveness of the battery. Furthermore, the corrosive materials also serve as ionic short circuit paths between the terminals. As a result, these corrosive products tend to reduce the capacity and cranking ability of the battery and, more importantly, shorten its life.

Accordingly, by recessing the terminals within the battery walls, the terminals may be protected from the more deleterious effects of the environment. Moreover, by virtue of the side terminal design, appreciable savings involving the quantity of lead utilized in the construction of the battery may be realized. Instead of employing a relatively long vertical lead riser to make contact with a terminal disposed in the battery cover, a substantially shorter riser may be used to make contact with a terminal disposed within an adjacent wall.

A common sidewall terminal configuration presently in use has a terminal plug passing through an aperture formed within the battery case wall. In some cases, the terminal plug is injection molded about the container. Regardless of the method employed, the back end of the plug is usually either flush with the inner wall of the container or it actually extends into the battery compartment itself. A riser is then welded or torch burned to the back end. Sometimes, an additional slab of lead is interposed between the riser and the back end of the plug. Representative designs are shown in U.S. Pat. Nos. 3,775,730, 4,143,215, 4,166,155, 3,767,407, 4,150,202 and 3,843,411.

Unfortunately, in attaining lead economy and terminal protection, a new problem arises with side terminal designs. By conscious choice, a side terminal is usually disposed at or below the electrolyte level of the battery. Sulfuric acid, with its well known propensity for creeping through the smallest of voids, will often leak out of the battery around the terminals.

In a nutshell, the leaking problem is engendered by the combination of a welded metallic terminal and a plastic container. Oftentimes, the welding step melts the plastic in the vicinity of the terminal so that upon cooling, the reformed plastic does not seal properly about the terminal. Given just the smallest crevice or space, the sulfuric acid will eventually find its way to the exterior of the battery case via the terminals. The leaking problem, as alluded to earlier, is exacerbated by the fact that most side terminal designs utilize a terminal construction which partially or completely passes through the sidewall. Accordingly, one way to alleviate the leaking problem has been the employment of wax about the back end of the terminal.

In summary, although sound in principle, injection molding techniques are relatively expensive when compared to the disclosed invention. Moreover, designs that employ plugs traversing the wall have been known to leak on occasion.

SUMMARY OF THE INVENTION

There is provided an improved battery having threaded sidewall terminals. In particular, one battery wall includes two spaced apertures surrounded by bosses extending outwardly from the wall. An electrically conductive plug is disposed within the boss and is flush against both the outside battery wall and the aperture. A riser, disposed within the battery case, is weldably connected to the plug through the aperture. The welding step, by deforming the sandwiched plastic wall about the aperture, ensures a leak-resistant seal between the plug and riser. An additional mechanical crimping step serves to further seal the terminal to the battery case. A mating groove, formed by one groove formed within the boss and one groove formed within the plug, accepts a battery cable connector.

The disclosed invention results in an improved leak resistent side terminal battery obviating the need for complex construction steps.

BRIEF DESCRIPTION OF THE DRAWINGS

FIG. 7 is a rear elevation of an embodiment of the invention.

FIG. 8 is a side view of FIG. 7.

PREFERRED MODE FOR CARRYING OUT THE INVENTION

Figure 1:
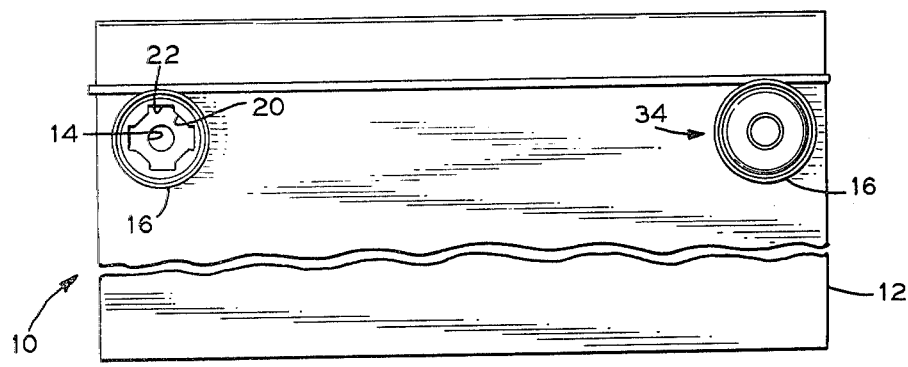
FIG. 1 is a side view of a battery case.

Referring to FIG. 1, there is shown a front view of a plastic battery case 10 having four substantially vertical walls 12, only one of which is depicted. The battery case 10 includes two spaced apertures 14 equally distanced from the top of the wall 12. The left side of FIG. 1 shows an empty boss 16 whereas the right side of FIG. 1 shows a battery terminal 34.

Figure 2:
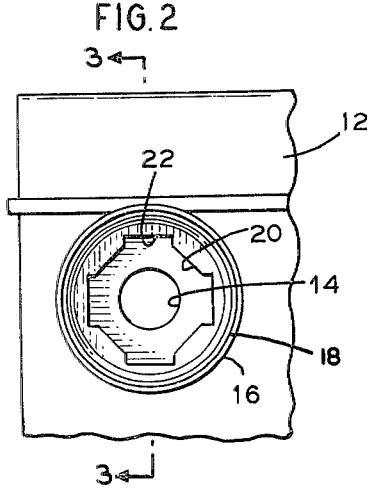
FIG. 2 is a front view of an embodiment of the invention.
Figure 3:
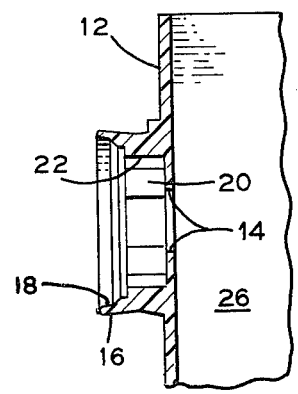
FIG. 3 is a view taken along line 3—3 of FIG. 2.
Figure 4:
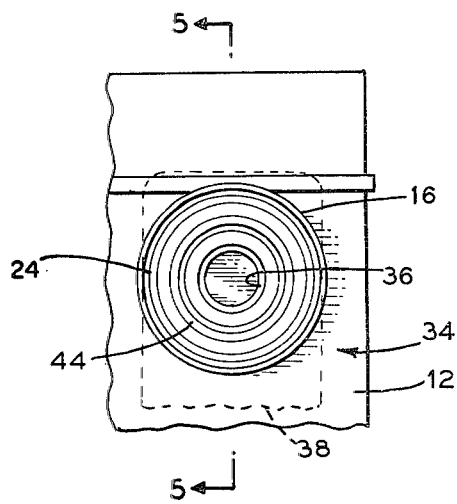
FIG. 4 is a front view of an embodiment of the invention.
Figure 5:
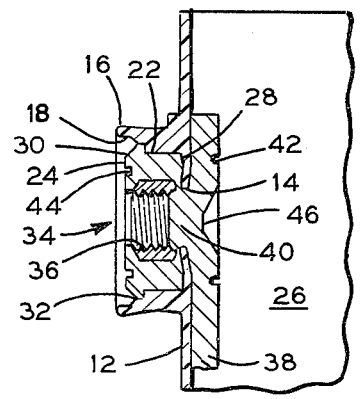
FIG. 5 is a cross-sectional view taken along line 5—5 of FIG. 4.
Figure 6:
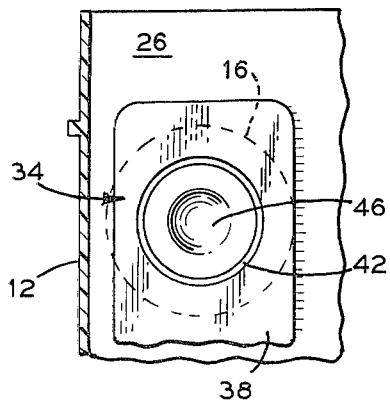
FIG. 6 is a back view of an embodiment of the invention.

FIGS. 2 and 3 depict a more detailed view of the boss 16 disposed within the battery wall 12. FIGS. 4, 5 and 6 illustrate detailed views of the terminal 34. It should be understood that most storage batteries include two terminals 34. The empty boss 16 is shown for discussion purposes only.

For the sake of brevity, the internals of the battery are not shown. However, the battery itself is typical in its construction. That is, as with most secondary battery designs, positive and negative plates are disposed in an alternating spaced relationship within the battery case. Separators are positioned between the plates. Moreover, a number of like polarity plates are electrically ganged together (positive to positive, negative to negative) to form a cell. A plurality of interconnected cells (usually three or six) constitute a battery. Sulfuric acid is the electrolyte. Two terminal risers, one riser electrically connected to the positive plates of one end cell and the other riser electrically connected to the negative plates of an oppositely disposed end cell, make contact with similarly designated terminals extending without the battery. It should be understood, however, that the disclosed invention is not limited to a particular type of lead acid battery. On the contrary, so-called maintenance free batteries, flat top batteries and all conventional lead antimony batteries may successfully utilize the disclosed invention to great advantage.

Referring now to FIGS. 2 and 3, the boss 16 outwardly extends from the wall 12 to circumscribe the aperture 14. First groove 18 is formed along the inner periphery of the boss 16. The boss 16 further includes an alternating series of locking lands 20 and depressions 22.

Moving on to FIGS. 4, 5 and 6, a lead (or lead alloy) terminal plug 24 is seen disposed within the boss 16. Note especially how the plug 24 does not extend into the battery compartment 26. Rather, the base 28 of the plug 24 abuts the exterior surface of the wall 12 while simultaneously sealing the aperture 14. The plug 24 is cast with corresponding lands 20A and depressions 22A so that it dovetails or nests between the lands 20 and depressions 22 of the boss 16. The lands 20 and 20A and depressions 22 22A serve to securely grasp the plug 24 and prevent it from rotating within the boss 16. See especially FIGS. 2, 5, 7 and 8

An acid-resistant nut 36, preferably made from stainless steel, is permanently disposed within the plug 24 to accept a threaded battery cable connector (not shown). It is in the realm of possibility that additional cable accepting means, other than the nut 36, may be employed to grasp the cable. For example, a spring loaded acceptor (not shown) may be employed with the instant invention. In any event, a second groove 30 is formed along the outer periphery of the plug 24. When the plug 24 is inserted into the boss 16, the first groove 18 and the second groove 30 form mating groove 32. The most common side terminal battery cable connector currently in use employs a circumferential lip to aid in connecting the connector to the terminal 34. The lip seats within the groove 32. See U.S. Pat. No. 3,775,730 for a detailed view of the connector.

Riser 38, affixed to a battery plate lug (not shown) and disposed within the case 10, is weldably connected 40 to the base 28 of the plug 24. See especially FIGS. 5 and 6. Note how the case wall 12, circumscribing the aperture 14 is distorted. The distorted plastic circumscribing the aperture 14 forms a leak-resistant seal between the plug 24 and the riser 38. Mechanical crimping rings 42 and 44 further ensure a leak-resistant seal. Indentation 46 is a result of the welding process which will be described more fully hereinafter.

The invention and manner of applying it may, perhaps, be better understood by a brief discussion of the principles underlying the invention.

As was alluded to earlier, molding a terminal plug through a battery wall is a relatively expensive proposition requiring specially designed molds and extra steps. Moreover, a terminal plug passing through the wall may lead to a leak-prone seal between the wall and the plug. The instant invention, on the other hand, completely eliminates the need for terminal injection molding. More importantly, however, the resulting terminal and method is believed to be superior than the designs and methods currently available.

Assembling the terminal 34 is actually quite simple and straightforward when compared to the current art. Prior to the terminal fabricating steps, the battery is manufactured in the usual manner. That is, the complete package of ganged plates, separators and straps has already been inserted into the container by known means. Moreover, two straps, each located in the vicinity of one of the terminals 34, have a riser 38 attached to them.

The terminal 34 is fabricated in the following manner. The plug 24 is merely press fitted into the boss 16, care being taken only to line up the locking lands 20 and depressions 22, until the base 28 is in complete registry with the exterior surface of the wall 12.

A conventional resistance welder (not shown) including two welding electrodes capable of stradling the battery wall 12 is utilized to weld the risers 38 to the plugs 24. One electrode flatly contacts the outer face of the plug 24 whereas the opposed electrode contacts the back of the riser 38. The outer electrode includes a center aperture.

Prior to the application of current to the electrodes, a threaded stud is inserted through the electrode aperture and screwed into the nut 36. The stud is bottomed in the nut 36 to prevent any molten lead from escaping from the joint 40 during the actual welding process. After the stud is properly inserted into the nut 36, sufficient electric current is passed through the electrodes to partially melt the riser 38 and the plug 24 together 40 in the vicinity of the aperture 14. Inasmuch as the plug 24 and riser 38 are initially separated, albeit by a small distance, the electrodes must simultaneously exert sufficient physical pressure on these two components in order to effect the welding operation. During the welding step, the portion of the wall 12 sandwiched between the riser 38 and the plug 24 is simultaneously melted and deformed by both the heat generated during the welding operation and the mechanical pressure exerted by the electrodes. The indentation 46 is a result of the welding process. After the welding step has been completed, the stud is removed from the nut 36.

Inorder to fully ensure a leak resistent seal, the now welded plug/riser combination is further subjected to a mechanical crimping operation. A pair of mechanically or hydraulically driven crimping tongs are placed over the outer face of the plug 24 and the riser 38. Mechanical pressure is then exerted by the tongs over the two surfaces to forcibly seal the terminal 34 with the wall 12. The portion of the wall 12 sandwiched between the plug 24 and the riser 38 is more forcibly deformed during this step than during the actual welding process. This further ensures the soundness of the joint seal. The crimping rings 42 and 44 are positive indication of this operation.

It should be appreciated that by not having the plug 24 completely pass through the wall, a tortuous acid flow barrier path is set up between the interior and exterior of the battery 10. Indeed, the cross section of the aperture 14 is substantially smaller than the cross section of the plug 24 so as to further deny the acid an opportunity to creep out of the battery.

In an alternate embodiment of the invention, a bead of acid-resistant petroleum based grease may be applied to the outer periphery of the plug 24 prior to the plug's insertion into the boss 16. This step further improves the terminal's already excellent resistance to acid creep. A preferred grease designated "NO-OX-ID "A" ESB" and manufactured by the Dearborn Chemical Company, Chicago, Ill., exhibits the requisite properties necessary for such application. This particular grease is capable of withstanding the relatively high temperatures experienced during the welding process. Furthermore, the grease does not promote nut 36 corrosion. It will, however, stop any acid leakage, in the unlikely event that a tiny quantity of acid is able to breach the seal.

It has been determined that for a circular plug 24 having a nominal outside diameter of approximately 0.875 inch (2.22 centimeters), the diameter of the corresponding circular aperture 14 should be approximately 0.375 inches (0.953 centimeters). The ratio between any two diameters may be approximately 2.3:1. The nominal outside diameter of the plug 24 is defined, for the purposes of this specification, as the average diameter of the base 28. Non-circular components displaying corresponding cross-sectional dimensional relationships may be employed as well.

Moreover, by initially spacing the plug 24 and strap 38 slightly apart from one another, one can employ the deformable nature of plastic to great advantage. When the electrodes cause sufficient localized heating to melt the lead riser 38 and the plug 36, they will also melt the sandwiched plastic of the wall 12 circumscribing the aperture 14. The melted plastic then proceeds to flow about the melted area 40 and fill the small crevices, fissures and voids of the lead in the area 40. This flowing and sealing action, plus the fact that the aperture 14 is much smaller than the plug 24, presents a very tortuous path for the acid to follow. Moreover, the mechanical crimping action further tightens the joint after it has been allowed to cool.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved storage battery having at least one side wall terminal, the terminal connectable to a battery cable, the battery including a case having a plurality of walls, a series of battery plates and separators disposed within the case, the plates ganged together by straps, at least one riser affixed to a strap, one of the walls having at least one aperture passing therethrough, and an outwardly extending boss circumscribing the aperture, the improvement which comprises the terminal including an electrically conductive plug disposed within the boss and in registry with the exterior wall of the case circumscribing the aperture, means for preventing the rotation of the plug in the boss, the plug having an external diameter substantially greater than the aperture thereby preventing the plug from passing through the aperture, the outer face of the plug having means for accepting the cable, the inner face of the plug covering the aperture and welded to the riser so as to sealingly sandwich a portion of the wall circumscribing the aperture between the inner face and the riser.

2. The battery according to claim 1 wherein the boss, the plug and the aperture have circular cross sections.

3. The battery according to claim 1 wherein the boss includes a first groove formed therein and the outer face includes a second groove adjacent to the first groove so as to form a mating groove between the boss and the outer face to accommodate the cable.

4. The battery according to claim 1 wherein the means for accepting the cable is a nut disposed within the plug.

5. The battery according to claim 1 wherein the portion of the wall sandwiched between the inner end of the plug and the riser is distorted by the application of heat and physical pressure.

6. The battery according to claim 1 wherein mechanical crimping rings circumscribe the outer face and the riser about the aperture.

7. The battery according to claim 1 wherein the means for preventing the rotation of the plug includes a series of alternating locking lands and depressions disposed in the boss and on the plug, the lands and depressions of the plug nesting between those in the boss.

8. The battery according to claim 1 wherein means for resisting acid creep is disposed between the plug and the boss.

9. The battery according to claim 1 wherein the case includes two spaced terminals disposed on the same wall.

* * * * *